March 3, 1931.  H. N. DURHAM  1,794,886
SIGN
Filed Aug. 3, 1928    2 Sheets-Sheet 1
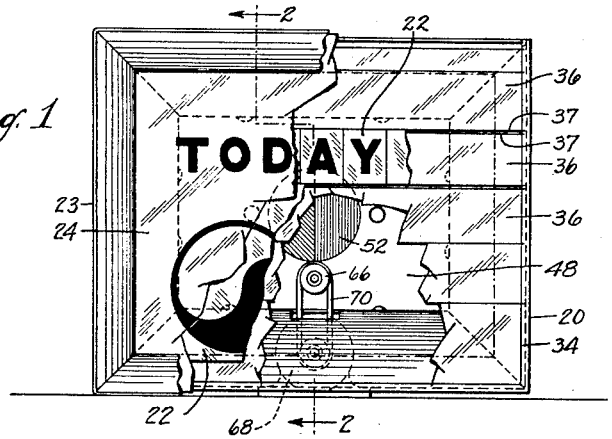
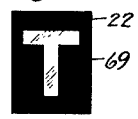
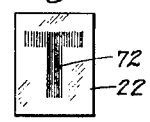
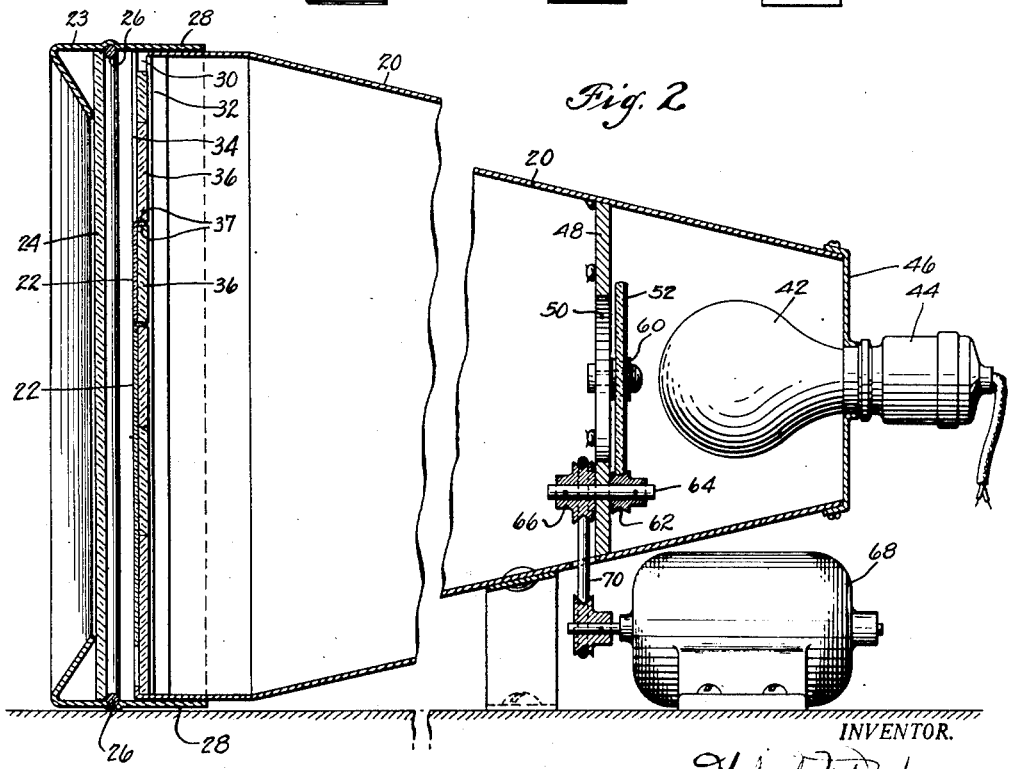
INVENTOR.

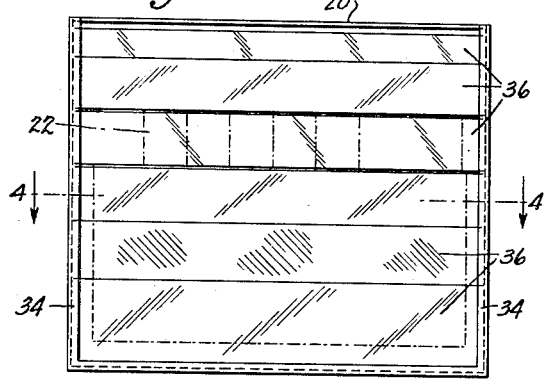
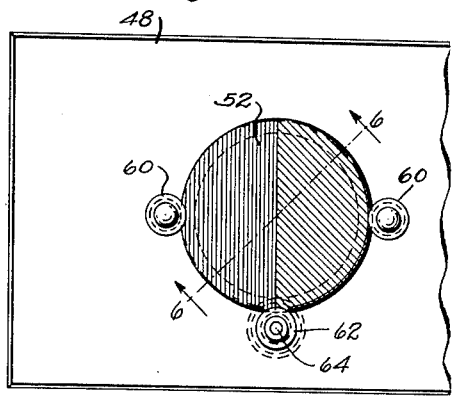
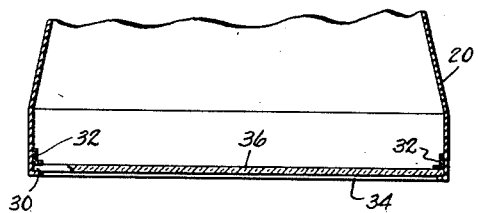
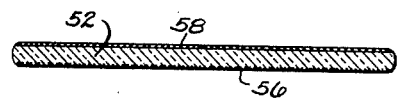
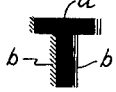
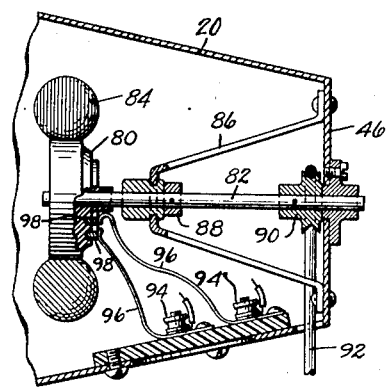
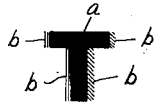
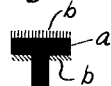
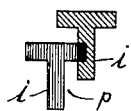
INVENTOR.

Patented Mar. 3, 1931

1,794,886

UNITED STATES PATENT OFFICE

HOBART N. DURHAM, OF JACKSON HEIGHTS, NEW YORK

SIGN

Application filed August 3, 1928. Serial No. 297,195.

This invention relates to signs of the type wherein an image of the desired reading matter is projected on a screen and thereby becomes visible. My invention has for its object the provision of a sign of this type, capable of producing an entirely novel effect which is very pleasing to the eye and commands attention, because of the unusual manner in which the appearance of the image is caused to change, either from time to time or continuously. Another object of my invention is a method of projecting images so that these brilliant and attractive effects are produced in a pleasing manner. Another object of my invention is the provision of a novel method of illumination whereby a surface may have cast upon it a plurality of images, preferably in overlapping relation, to produce the effect of a single image having differently colored borders. Still another object is the provision of a novel method whereby parallax images of image forming elements may be projected on an image receiving surface, and may be moved relative to each other, if desired, the images preferably being cast on the surface in overlapping relation. Another and further object of the invention is the provision of a simple and practical form of apparatus whereby the novel method may be carried out. Other objects and advantages of my invention will be apparent from the following description or will be learned by practice of the invention.

The present preferred embodiment of apparatus for carrying out the present invention consists of a sign, the principal elements of which are, preferably, although not necessarily a surface on which an image of image forming elements is formed and illuminating means for forming the images, which means may rotate or move in other paths to cause the images of the elements to move relative to each other, blending and dissolving and thus producing colored images of varying appearance.

In the drawings:

Figure 1 is an elevation of one embodiment of my sign, certain parts of which have been broken away to reveal the inner construction.

Figure 2 is a cross section taken on the line 2—2 of Figure 1.

Figure 3 is a front elevation of the sign with the front frame and screen removed.

Figure 4 is a cross section taken on the line 4—4 of Figure 3.

Figure 5 is a view of the means for producing a beam of multicolored light.

Figure 6 is a cross section of the disc shown in Figure 5 and taken on the line 6—6 of that figure.

Figure 7 is a perspective view of one of my image forming elements for use in this sign.

Figures 8 and 9 are front elevations of image forming elements of a modified form.

Figures 10, 10a, 10b and 10c are diagrammatic views of the changing image cast by a typical letter on the screen, together with a diagrammatic showing of the position of the colored light sources.

Figure 11 is a view of the images cast by a typical letter showing the exaggerated effect caused by spacing the screen a considerable distance from the image forming elements, and Figure 12 is a vertical cross section of a modified form of the light source shown in Figures 1, 2 and 6, and taken on a line slightly to one side of the longitudinal axis of the casing.

Throughout the drawings, similar numerals designate similar parts.

A box or casing 20 houses the working parts of the sign allowing only the light passed by the image forming elements 22 to illuminate the screen 24 mounted in a frame 23 forming the front end of the casing. The screen is preferably made of translucent material such as ground glass and is held in the sheet metal frame by a retaining spring 26 of approximately the same shape as the edge of the screen and pressing against the frame. The rectangular sides 28 of the frame are made very slightly larger than the casing and thus the frame may be telescoped over the casing and held in place frictionally. Due to this construction, the distance between the screen and the front end of the casing may be varied as desired. The front end of the casing is provided with channels 30 on its opposite upright sides, formed by the small angle strips 32 with the bent-over edges 34 of the sheet metal sides. In these channels 30 are disposed a series of narrow longitudinally extending transparent strips 36, of glass or similar material, freely movable up and down, but otherwise limited in their movement by the sides of the channels. These strips are adapted to receive, support and hold the image forming elements between the adjacent edges 37 of the strips.

The image forming elements 22 may be of any convenient size and are formed of a sheet 38 of transparent material, one edge of which is bent over to form less than a right angle with the body of the element, thus providing an edge 40 which may be inserted between the adjacent strips of transparent material. The weight of the superposed strips holds the elements 22 in place. The bending of the edge to form less than a right angle insures that the body of the elements will lie flat against the transparent strips 36. This mounting provides an assembly in which letters or designs of many different sizes may be mounted, and the substitution of one set of image forming elements for another is facilitated.

At a considerable distance from the image forming elements and preferably at the rear of the casing is provided a source of multicolored light which may consist of a lamp 42 mounted in a socket 44, secured to the rear wall 46 of the casing in any suitable manner. The rear wall is preferably made removable from the casing so that adjustments may be made. Immediately in front of the lamp and substantially closing the space between the walls of the casing, is a rigid web or partition 48, provided with an opening 50 slightly smaller than the lamp. On one side of the opening is mounted a translucent disc 52 provided on one surface with areas of different colors and capable of diffusing the transmitted rays of light to the desired extent. This diffusion is preferably accomplished by having the uncolored surface of the disc roughened, as at 56, either by grinding, etching or by the application of small glass beads adhesively secured. The colored areas are produced by securing to the disc sheets of colored transparent material 58 of suitable size and shape to provide distinct areas of different color, and in the instant case the colors have been represented as red and green, but it should be understood that any two colors are equally suitable.

The color disc is removably mounted for rotation on web 48 by means of small grooved rollers 60 which hold it against lateral movement and roller 62 mounted on shaft 64. On this shaft and at the other side of the web is mounted a small pulley 66 driven by motor 68 through a belt 70 or by other suitable means. The disc can be readily removed and another disc with different colors substituted by merely withdrawing the disc with a slight initial movement in an upward direction. This mounting is preculiarly effective as it enables the disc to be driven at a speed of 100 to 150 r. p. m., the optimum speed, with a minimum amount of power.

The image forming elements themselves are formed of some flexible transparent material, such as celluloid, and have formed thereon designs or characters in opaque, and preferably black, material 69, leaving the image forming means either as a silhouette (Figure 8) or as an opaque design on a transparent base (Figure 7).

Another form of image forming elements found to give pleasing effects is that shown in Figure 9, wherein a design is formed of closely spaced opaque lines 72 substantially filling the imaginary outline of the design. Other types of elements are suitable for use in this sign however and they might formed of opaque material cut out in the shape of the letter or design, or cut stencil-like. Still again they might be formed of sheets of transparent material with rounded bulging lines forming the lines of the design, which rounded portions would function as cylindrical lenses focusing the multicolored rays of light from the disc or lamps on the screen and in the form of a design.

A modified form of the source of multicolored light is shown in Figure 12 where a block 80 mounted on a shaft 82 carries a plurality of sockets retaining lamps 84 of different colors. This shaft is mounted for rotation in brackets 86 supported by the rear wall 46 of the casing 20 and held against endwise movement by collars 88. A pulley 90 mounted on the shaft is adapted to receive a belt 92 and rotate the shaft from a motor (not shown) outside the casing. The lamps are supplied with the necessary electrical energy by wires connected to binding posts 94, to which are connected the brushes 96 contacting with rings 98.

In operation, the cover 23 containing the screen will be placed over the end of the casing provided with the transparent strips 36 bearing image forming elements, the screen being separated from the image forming elements 22 to the desired extent. In this relation, the screen, image forming elements and disc, or plane of rotation of the lamps, are all subtsantially parallel. If the light be now turned on, the image forming elements will cast their images on the screen in overlapping relation, as shown in Figure 10, due to the parallax caused by the different colored rays of light coming from points having different angular relation to the image forming elements and the separation of the screen from the image forming elements. Each colored area thus causes a substantially separate image with distinct coloring to be cast on the screen, the coloring depending on the colors of the light sources, the overlapping depending on the separation of the screen from the image forming elements, the spacing and size of the colored light sources and the distance of the light source from the image forming elements.

If the disc 52 or lights 84 be rotated, the images cast on the screen will travel in small circular paths about each other in accordance with the rotation of the colored illuminated elements and the colored borders formed by the overlapping of the images will continually shift in a cycle illustrated diagrammatically by Figures 10, 10a, 10b, and 10c. In these figures, the images cast by a typical image forming element are shown in overlapping relation and in those parts which overlap, the images will be dark and unilluminated, as at a, and each image will show its own color, penumbra-like, at the border b of the common image a. When the disc 52 is in the position indicated by the diagrammatic disc d of Figure 10, the sides of the letter alone will present colored penumbra borders, the right edge of the image being red inasmuch as the right half of the disc is red. The top and bottom edges will present penumbra borders formed of an equal amount of light of each color and will present an appearance similar to the background. As the disc rotates, the sides of the image will lose their distinctive color and when the disc has rotated 90° the sides will be a blended color and the top and bottom will have attained the color of the sides. As the disc rotates further the colors will die out or merge, becoming part of the background on the top and bottom and the edges will color again as in the first stage of the cycle, but with the colors reversed. The final stage, when the disc has rotated 270°, will present the colors in the reversed position of the second stage. As the disc is rotated further the cycle will be repeated in exactly the same manner and as long as the rotation of the disc continues the blending and dissolving of the component colors is effected in synchronism with the rotation.

With image forming elements of the type illustrated in Figure 9, the image as a whole is formed of a multiplicity of parallax images forming alternate lines of different color, when the dividing line between the different colors of the disc is parallel with the lines of the image forming elements, and as this dividing line approaches a right angle to the lines of the elements, the image blends into the background color and is visible only as a single colored penumbral area, slightly darker than the surrounding background.

Figure 11 shows the exaggerated effect produced by an extreme separation of the screen 24 and elements 22 and in this case the two parallax images i travel in a circular path, the lower left-hand corner of the "T" of each color moving about the point p as a center. Similarly every pair of corresponding points of the two images move about some point midway between them as a center. Where the images overlap, the screen is dark, and the areas on which neither image is cast are colored by the additive color of the colors employed. The non-overlapping portions of the penumbral images each have their distinctive color.

My invention provides a very simple and inexpensive sign, requiring but little power for its operation with practically no parts that can become seriously disarranged, and produces an attractive and striking effect.

It will be understood that the invention is not limited to the details of the various steps and mechanisms, but that changes may be made therein without departing from the principles of the invention, and without sacrificing its chief advantages.

What I claim and desire to secure by Letters Patent is:

1. In a sign, the combination of a screen, a plurality of colored light sources and opaque image forming elements adapted to cast visibly distinct colored images in overlapping relation on the screen.

2. In a sign, the combination of a translucent screen, means for producing multicolored light movable about a point and image forming elements between the light source and screen arranged to cast images on the screen.

3. In a sign, an image receiving surface, image forming means, a source of multicolored light adapted to cast a plurality of images of the means and additional means causing the images to move relatively to the image forming means.

4. A sign comprising a translucent image receiving surface, opaque image forming means, illuminated color elements movable about a common point to cast overlapping images of the opaque image forming means on the image surface.

5. A sign comprising a translucent screen, image forming means, a multicolored disc, illuminated by a light source and movable about a point, arranged in the order named whereby multicolored images of the image forming means are cast in overlapping relation and move relative to each other.

6. In a sign, a screen of translucent material, a support behind the screen and spaced therefrom adapted to receive opaque image forming elements, illuminated multicolored areas movable about a common point adapted to project multicolored overlapping images of the image forming elements on the screen which images move relative to each other when the illuminated areas are moved.

7. In a sign, a screen, means for producing multicolored, similarly shaped, parallax images on the screen and means for causing relative movement of the images.

8. The method of projecting images for a sign, which consists in forming a plurality of differently colored parallax images on a screen and moving said images relative to each other in closed paths.

9. In a sign, the combination of a light-diffusing screen, a light source, a support for holding image forming elements, image forming elements adapted to be retained on said support, a disc having differently colored translucent areas, a case, one side of which is formed by the screen and means for rotating the disc, whereby the several differently colored images cast by the image forming elements on the screen are caused to move in closed paths about each other in overlapping relation and thus produce areas of blended color bordered with edges of different colors, the colors of said edges being adapted to move relative to the areas as the disc is rotated.

10. In a sign, a translucent screen forming one side of a box, a support for image forming elements, a multicolored translucent disc, means for moving the disc about a point, and a source of light, the screen, support and disc being arranged in substantially parallel planes and in the order named, whereby images corresponding in color to the colors of the disc are formed on the screen in overlapping relation and are moved relative to each other.

11. In a sign, a screen, means for casting differently colored images on the screen in overlapping relation, and means for moving the images relative to each other.

12. The method of projecting images in a sign, which includes, illuminating a translucent screen from a plurality of differently colored spaced sources of light, intercepting a portion of the light to form images on the screen, and moving the light sources to cause relative movement of the images so formed.

13. The method of projecting images in a sign, which includes simultaneously forming a plurality of similarly-shaped images on an image receiving surface and moving said images relative to each other.

14. A sign including the combination of a translucent image receiving surface, image forming means adjacent said surface, a multicolored illuminator for casting differently colored overlapping images on the surface, and means for moving the several colored images relative to each other.

15. A sign including the combination of a translucent screen, image forming means adjacent the screen, a multicolored illuminator for casting differently colored overlapping images on the screen and means for varying the extent of the overlapping of said images.

16. The method of forming images for a sign which includes forming substantially unilluminated design areas on a surface, forming illuminated borders of one color around portions of the design areas, forming illuminated borders of a different color around other portions of the design areas, and illuminating the remainder of the surface by light of the combined color of the border portions.

17. The method of forming images for a sign which includes forming substantially unilluminated design areas on a surface, forming illuminated borders of one color around portions of the design areas, forming illuminated borders of a different color around other portions of the design areas, illuminating the remainder of the surface by light of the combined color of the border portions, and moving the colored borders relative to the unilluminated areas.

18. A sign including the combination of a translucent image receiving surface, a multicolored illuminator spaced from the surface, image forming means adjacent the surface and in the path of the light cast by the illuminator on the surface, said illuminator and image forming means cooperating to produce differently colored overlapping images on the image receiving surface.

19. A sign including in combination a screen, a source of multicolored light spaced from the screen, means for intercepting a portion of the light of each color to form overlapping images on the screen, and means moving the intercepting means and the light source relative to each other to change the appearance of the images on the screen.

20. In a sign the combination of a screen, a plurality of differently-colored light sources, means for intercepting a portion of the light cast by the lights on the screen, said light sources and intercepting means being spaced from the screen so that overlapping differently-colored parallax images of the intercepting means are cast on the screen, and means for varying the extent of overlapping of the images.

21. In a sign the combination of a screen, a plurality of differently-colored light sources, means for intercepting a portion of the light cast by the lights on the screen, said light sources and intercepting means being spaced from the screen so that overlapping differently-colored parallax images of the intercepting means are cast on the screen.

In testimony whereof, I have signed my name to this specification.

HOBART N. DURHAM.